United States Patent
Hasegawa et al.

(10) Patent No.: US 9,287,797 B2
(45) Date of Patent: Mar. 15, 2016

(54) ELECTRIC POWER CONVERTING DEVICE AND ELECTRIC POWER CONVERTING METHOD

(71) Applicant: KABUSHIKI KAISHA TOSHIBA, Minato-ku (JP)

(72) Inventors: Ryuta Hasegawa, Tokyo (JP); Yosuke Nakazawa, Tokyo (JP); Kentaro Suzuki, Tokyo (JP); Katsuhisa Inagaki, Tokyo (JP); Teruyuki Ishizuki, Tokyo (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 154 days.

(21) Appl. No.: 14/057,367

(22) Filed: Oct. 18, 2013

(65) Prior Publication Data

US 2014/0119068 A1    May 1, 2014

(30) Foreign Application Priority Data

Oct. 30, 2012  (JP) .................................. 2012-239216

(51) Int. Cl.
*H02M 7/48*  (2007.01)
*H02M 5/458*  (2006.01)

(52) U.S. Cl.
CPC .................................. *H02M 5/4585* (2013.01)

(58) Field of Classification Search
CPC ......... H02M 7/48; H02M 7/487; H02M 1/10; H02M 5/4585; H02J 9/062
USPC ........... 363/17, 37, 39, 41, 58, 67, 89, 96–98, 363/132; 318/434, 490, 727, 748, 797, 799, 318/801, 802, 808, 810, 811
See application file for complete search history.

(56) References Cited

U.S. PATENT DOCUMENTS

| | | | | |
|---|---|---|---|---|
| 5,111,376 A | * | 5/1992 | Mehl | H02J 3/26 307/103 |
| 5,742,493 A | * | 4/1998 | Ito | B60L 3/0023 363/37 |
| 5,790,396 A | * | 8/1998 | Miyazaki | H02M 7/487 363/41 |
| 6,490,185 B1 | * | 12/2002 | Yamanaka et al. | 363/98 |
| 6,535,406 B1 | * | 3/2003 | Asaeda | H02M 7/487 363/98 |
| 6,850,032 B1 | * | 2/2005 | Peterson | H02M 7/493 318/526 |
| 8,400,792 B2 | * | 3/2013 | Sato et al. | 363/39 |

FOREIGN PATENT DOCUMENTS

| | | |
|---|---|---|
| JP | 9-182451 | 7/1997 |
| JP | 2000-228883 | 8/2000 |

* cited by examiner

*Primary Examiner* — Rajnikant Patel
(74) *Attorney, Agent, or Firm* — Oblon, McClelland, Maier & Neustadt, L.L.P.

(57) ABSTRACT

In one embodiment, an electric power converting device includes a converter which converts a three-phase AC voltage output from a three-phase AC power source, into a DC voltage of each phase of a three-phase AC load, and an inverter which converts the DC voltage converted by the converter, into a single-phase AC voltage of each phase of the three-phase AC load. The converter includes for each phase of an electric power system a circuit which consists of a plurality of switching elements connected in series. The electric power converting device controls on/off of a switching element corresponding to one of phases of the electric power system in the converter such that a voltage which reduces fluctuation of a DC voltage applied between the converter and the inverter and corresponding to each phase of the three-phase AC load is output from the converter for each phase of the electric power system.

6 Claims, 6 Drawing Sheets

| | OUTPUT VOLTAGE | $S_{UA1}$ | $S_{UA2}$ | $S_{UA3}$ | $S_{UA4}$ | $S_{UB1}$ | $S_{UB2}$ | $S_{UB3}$ | $S_{UB4}$ |
|---|---|---|---|---|---|---|---|---|---|
| 1 | $+V_{DC}$ | ON | ON | OFF | OFF | OFF | OFF | ON | ON |
| 2 | $+V_{DC}/2$ | ON | ON | OFF | OFF | OFF | ON | ON | OFF |
| 3 | $+V_{DC}/2$ | OFF | ON | ON | OFF | OFF | OFF | ON | ON |
| 4 | 0 | ON | ON | OFF | OFF | ON | ON | OFF | OFF |
| 5 | 0 | OFF | ON | ON | OFF | OFF | ON | ON | OFF |
| 6 | 0 | OFF | OFF | ON | ON | OFF | OFF | ON | ON |
| 7 | $-V_{DC}/2$ | OFF | OFF | ON | ON | OFF | ON | ON | OFF |
| 8 | $-V_{DC}/2$ | OFF | ON | ON | OFF | ON | ON | OFF | OFF |
| 9 | $-V_{DC}$ | OFF | OFF | ON | ON | ON | ON | OFF | OFF |

FIG. 2

ELECTRIC POWER CONVERTING DEVICE AND ELECTRIC POWER CONVERTING METHOD

CROSS REFERENCE TO RELATED APPLICATION

This application is based upon and claims benefit of priority from the Japanese Patent Application No. 2012-239216, filed on Oct. 30, 2012, the entire contents of which are incorporated herein by reference.

FIELD

Embodiments described herein relate generally to an electric power converting device and an electric power converting method.

BACKGROUND

An electric power converting device which outputs high electric power converts a high voltage. In this case, as a device which converts DC electric power into AC electric power, a neutral-point-clamped (NPC) inverter is used. Further, as an inverter which outputs a high voltage, a single-phase NPC inverter which provides a full-bridge using two NPC legs per phase is used.

A DC link voltage of the above single-phase NPC inverter fluctuates at a frequency which is twice as a frequency of an output voltage. Further, when the single-phase NPC inverter outputs a low frequency voltage, a fluctuation width of the DC link voltage which is a voltage of the DC link capacitor between an inverter and a converter increases.

To reduce this significant fluctuation, capacity of the DC link capacitor may be increased. However, when the capacity of the DC link capacitor is increased, it is not possible to avoid that a device becomes larger and more costly.

BRIEF DESCRIPTION OF THE DRAWINGS

FIG. 2 is a view illustrating a table format of an example of a relationship between an output voltage of an inverter unit of the electric power converting device and switching element states according to the embodiment;

DETAILED DESCRIPTION

In one embodiment, an electric power converting device includes a converter which converts a three-phase AC voltage output from a three-phase AC power source, into a DC voltage of each phase of a three-phase AC load, an inverter which converts the DC voltage converted by the converter, into a single-phase AC voltage of each phase of the three-phase AC load, and a capacitor which is connected to a terminal between the converter and the inverter. The converter comprises for each phase of an electric power system a circuit which consists of a plurality of switching elements connected in series. The electric power converting device further includes a control unit which controls on/off of a switching element corresponding to one of phases of the electric power system in the converter such that a voltage which reduces fluctuation of a DC voltage applied between the converter and the inverter and corresponding to each phase of the three-phase AC load is output from the converter for each phase of the electric power system.

Hereinafter, an embodiment will be described with reference to the drawings.

Figure 1:
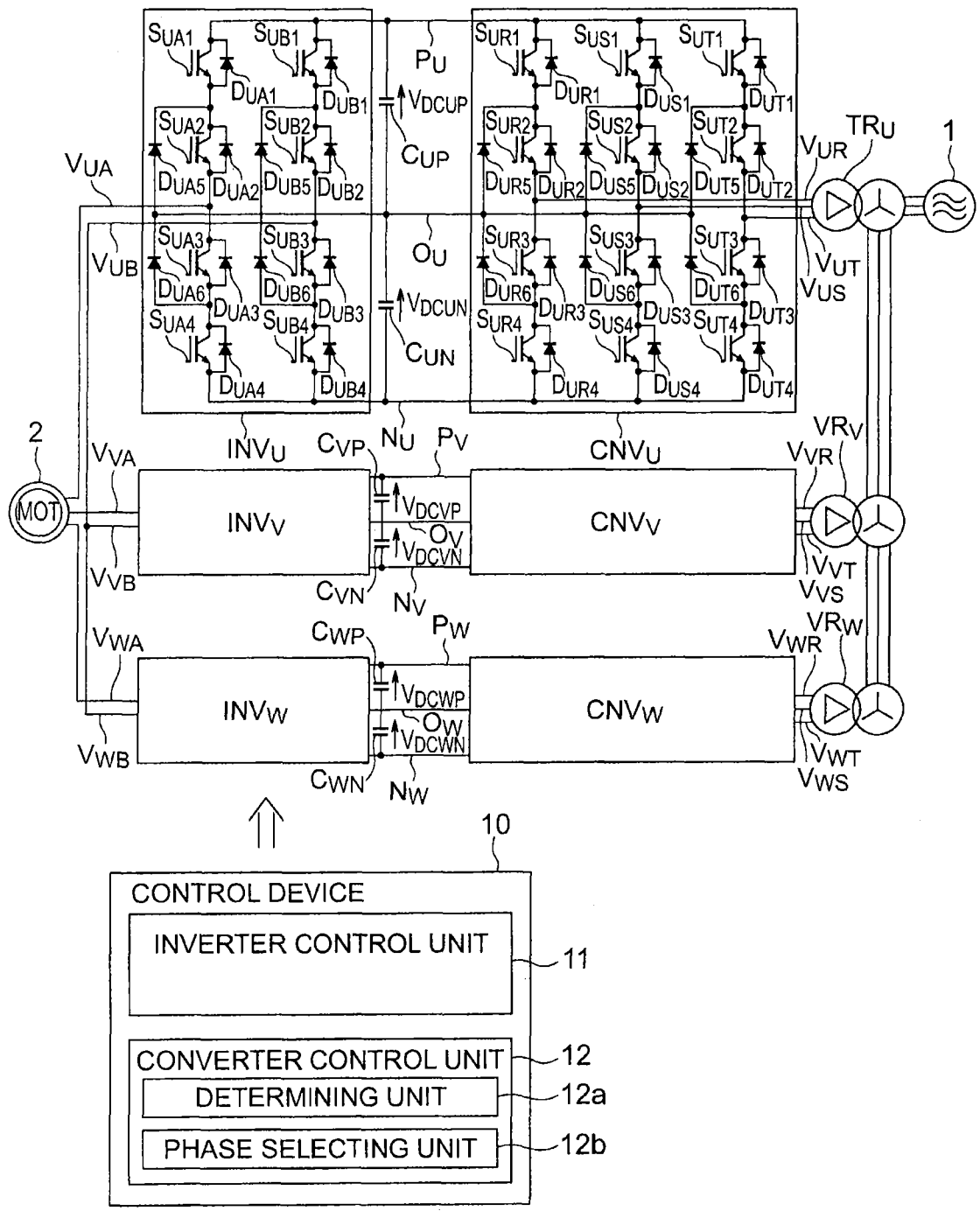
FIG. 1 is a view illustrating an example of a circuit configuration of an electric power converting device according to an embodiment.

FIG. 1 is a view illustrating an example of a circuit configuration of an electric power converting device according to the embodiment.

This electric power converting device converts a three-phase AC voltage E from a three-phase AC power source 1 into a DC voltage once. Further, the electric power converting device converts this DC voltage into an arbitrary AC voltage of an arbitrary frequency, and drives a three-phase AC load. In the present embodiment, the three-phase AC load is a three-phase electric motor (MOT) 2. Further, in the present embodiment, three phases of an electric power system are referred to as R, S and T phases, and three phases of the three-phase electric motor 2 are referred to as U, V and W phases.

The electric power converting devices are classified into an electric power converting device of the U phase, an electric power converting device of the V phase and an electric power converting device of the W phase. The electric power converting device of the U phase includes a converter transformer $TR_U$ which converts the three-phase AC voltage E into a DC voltage, and a converter unit $CNV_U$. Further, this electric power converting device of the U phase includes an inverter unit $INV_U$ which converts the DC voltage obtained by performing conversion in this way, into a single-phase AC voltage.

Remarkable features of the present embodiment compared to an old technique lie in controlling on/off of switching elements of converter units and reducing fluctuation of DC link voltages. Hereinafter, where necessary, a DC link voltage is simply referred to as a DC voltage.

The converter unit $CNV_U$ is a three-phase neutral-point-clamped (NPC) type. Further, this converter unit $CNV_U$ employs a three-phase half-bridge configuration in which three NPC legs corresponding to respective phases of the R, S and T phases are connected in parallel. Output terminals of respective neutral points of the three NPC legs of the converter unit $CNV_U$ are connected to a DC winding wire of the converter transformer $TR_U$. The converter unit $CNV_U$ includes a DC voltage terminal. This DC voltage terminal consists of a high potential side terminal $P_U$, a neutral point side terminal $O_U$ and a low potential side terminal $N_U$.

Further, the inverter unit $INV_U$ is the same neutral-point-clamped (NPC) type as that of the converter unit $CNV_U$. Furthermore, this inverter unit $INV_U$ employs a full-bridge configuration in which two NPC legs are connected in parallel. The high potential side terminal $P_U$, the neutral point side terminal $O_U$ and the low potential side terminal $N_U$ are also common to those of the inverter unit $INV_U$.

Further, two DC link capacitors $C_{UP}$ and $C_{UN}$ are provided between the inverter unit $INV_U$ and the converter unit $CNV_U$.

One end of the DC link capacitor $C_{UP}$ is connected to the high potential side terminal $P_U$. The other end of the DC link capacitor $C_{UP}$ and one end of the DC link capacitor $C_{UN}$ are connected to the neutral point side terminal $O_U$. The other end of the DC link capacitor $C_{UN}$ is connected to the low potential side terminal $N_U$.

Similar to the electric power converting device of the U phase, the electric power converting device of the V phase includes a converter transformer $TR_V$, a converter unit $CNV_V$ and an inverter unit $INV_V$. Configurations of the converter transformer $TR_V$, the converter unit $CNV_V$ and the inverter unit $INV_V$ are the same as the configurations of the converter transformer $TR_U$, the converter unit $CNV_U$ and the inverter unit $INV_U$ of the electric power converting device of the U phase.

Further, similar to the electric power converting devices of the U phase and the V phase, the electric power converting device of the W phase includes a converter transformer $TR_W$, a converter unit $CNV_W$ and an inverter unit $INV_W$. Configurations of the converter transformer $TR_W$, the converter unit $CNV_W$ and the inverter unit $INV_W$ are the same as the configurations of the converter transformer $TR_U$, the converter unit $CNV_U$ and the inverter unit $INV_U$ of the electric power converting device of the U phase.

Further, voltage/electric current ratings of converter transformers, converter units and inverter units of the respective U, V and W phases are the same between the respective phases.

Furthermore, as illustrated in FIG. 1, two DC link capacitors $C_{VP}$ and $C_{VN}$ are provided between the inverter unit $INV_V$ and the converter unit $CNV_V$ of the V phase.

One end of the DC link capacitor $C_{VP}$ is connected to the high potential side terminal $P_V$. The other end of the DC link capacitor $C_{VP}$ and one end of the DC link capacitor $C_{VN}$ are connected to the neutral point side terminal $O_V$. The other end of the DC link capacitor $C_{VN}$ is connected to the low potential side terminal $N_V$.

Further, as illustrated in FIG. 1, two DC link capacitors $C_{WP}$ and $C_{WN}$ are provided between the inverter unit $INV_W$ and the converter unit $CNV_W$ of the W phase.

One end of the DC link capacitor $C_{WP}$ is connected to the high potential side terminal $P_W$. The other end of the DC link capacitor $C_{WP}$ and one end of the DC link capacitor $C_{WN}$ are connected to the neutral point side terminal $O_W$. The other end of the DC link capacitor $C_{WN}$ is connected to the low potential side terminal $N_W$.

AC winding wires of the converter transformers $TR_U$, $TR_V$ and $TR_W$ are connected in series in order of the converter transformers $TR_U$, $TR_V$ and $TR_W$. Further, a converter transformer of a lowermost stage of the electric power converting device of each phase in FIG. 1 is the converter transformer $TR_W$. Furthermore, the converter transformer $TR_U$ of the uppermost stage illustrated in FIG. 1 is connected to the three-phase AC power source 1. According to this configuration, a voltage obtained by adding output voltages of the converter units $CNV_U$, $CNV_V$ and $CNV_W$ of the respective phases to be output to the electric power system is output the electric power system.

Further, one of two output terminals led from the inverter unit of each phase to the three-phase electric motor 2 is mutually connected to one of output terminals of inverter units of other phases. This connection point is a virtual neutral point of the inverter unit of each phase. The other output terminal led from the inverter unit of each phase to the three-phase electric motor 2 is connected respectively to a terminal of each phase of the three phases of the three-phase electric motor 2.

Next, a detailed configuration of each inverter unit illustrated in FIG. 1 will be described using the U phase as an example.

The inverter unit $INV_U$ of the U phase illustrated in FIG. 1 includes eight switching elements $S_{UA1}$, $S_{UA2}$, $S_{UA3}$, $S_{UA4}$, $S_{UB1}$, $S_{UB2}$, $S_{UB3}$ and $S_{UB4}$. Further, this inverter unit $INV_U$ includes eight freewheel diodes $D_{UA1}$, $D_{UA2}$, $D_{UA3}$, $D_{UA4}$, $D_{UB1}$, $D_{UB2}$, $D_{UB3}$ and $D_{UB4}$. These freewheel diodes are connected to all switching elements by way of anti-parallel connection on a one-on-one basis. Further, the inverter unit $INV_U$ includes four clamp diodes $D_{UA5}$, $D_{UA6}$, $D_{UB5}$ and $D_{UB6}$ connected to the neutral point.

These switching elements $S_{UA1}$, $S_{UA2}$, $S_{UA3}$ and $S_{UA4}$, freewheel diodes $D_{UA1}$, $D_{UA2}$, $D_{UA3}$ and $D_{UA4}$ and clamp diodes $D_{UA5}$ and $D_{UA6}$ form a first leg of the inverter unit $INV_U$.

These switching elements $S_{UA1}$, $S_{UA2}$, $S_{UA3}$ and $S_{UA4}$ are connected in series in order of $S_{UA1}$, $S_{UA2}$, $S_{UA3}$ and $S_{UA4}$ from the high potential side of the inverter unit $INV_U$ to the low potential side. An anode of the clamp diode $D_{UA5}$ is connected to the neutral point of the inverter unit $INV_U$, and a cathode of the clamp diode $D_{UA5}$ is connected to a connection point of the switching elements $S_{UA1}$ and $S_{UA2}$. A cathode of the clamp diode $D_{UA6}$ is connected to the neutral point of the inverter unit $INV_U$ side, and an anode of the clamp diode $D_{UA6}$ is connected to a connection point of the switching elements $S_{UA3}$ and $S_{UA4}$.

The switching element $S_{UA1}$ is connected with the freewheel diode $D_{UA1}$ by way of anti-parallel connection, and the switching element $S_{UA2}$ is connected with the freewheel diode $D_{UA2}$ by way of anti-parallel connection. Further, the switching element $S_{UA3}$ is connected with the freewheel diode $D_{UA3}$ by way of anti-parallel connection, and the switching element $S_{UA4}$ is connected with the freewheel diode $D_{UA4}$ by way of anti-parallel connection.

Furthermore, the switching elements $S_{UB1}$, $S_{UB2}$, $S_{UB3}$ and $S_{UB4}$, the freewheel diodes $D_{UB1}$, $D_{UB2}$, $D_{UB3}$ and $D_{UB4}$ and the clamp diodes $D_{UB5}$ and $D_{UB6}$ form a second leg of the inverter unit $INV_U$.

These switching elements $S_{UB1}$, $S_{UB2}$, $S_{UB3}$ and $S_{UB4}$ are connected in series in order of $S_{UB1}$, $S_{UB2}$, $S_{UB3}$ and $S_{UB4}$ from the high potential side of the inverter unit $INV_U$ to the low potential side. An anode of the clamp diode $D_{UB5}$ is connected to the neutral point of the inverter unit $INV_U$ side. A cathode of the clamp diode $D_{UB5}$ is connected to a connection point of the switching elements $S_{UB1}$ and $S_{UB2}$ side. A cathode of the clamp diode $D_{UB6}$ is connected to the neutral point of the inverter unit $INV_U$ side. An anode of the clamp diode $D_{UB6}$ is connected to a connection point of the switching elements $S_{UB3}$ and $S_{UB4}$.

The switching element $S_{UB1}$ is connected with the freewheel diode $D_{UB1}$ by way of anti-parallel connection, and the switching element $S_{UB2}$ is connected with the freewheel diode $D_{UB2}$. Further, the switching element $S_{UB3}$ is connected with the freewheel diode $D_{UB3}$ by way of anti-parallel connection, and the switching element $S_{UB4}$ is connected with the freewheel diode $D_{UB4}$ by way of anti-parallel connection.

That is, the inverter unit $INV_U$ is an NPC full-bridge electric power converting device in which the switching elements $S_{UA1}$, $S_{UA2}$, $S_{UA3}$ and $S_{UA4}$ are connected in series and the switching elements $S_{UB1}$, $S_{UB2}$, $S_{UB3}$ and $S_{UB4}$ are connected in series to configure the two legs.

Further, a potential difference $V_{UA}-V_{UB}$ between a connection point potential $V_{UA}$ of the switching elements $S_{UA2}$ and $S_{UA3}$ and a connection point potential $V_{UB}$ of the switching elements $S_{UB2}$ and $S_{UB3}$ is output to the three-phase electric motor 2. This potential difference means a PWM (Pulse Width Modulation) voltage.

Next, a detailed configuration of each converter unit illustrated in FIG. 1 will be described using the U phase as an example.

The converter unit $CNV_U$ of the U phase includes twelve switching elements $S_{UR1}$, $S_{UR2}$, $S_{UR3}$, $S_{UR4}$, $S_{US1}$, $S_{US2}$, $S_{US3}$, $S_{US4}$, $S_{UT1}$, $S_{UT2}$, $S_{UT3}$ and $S_{UT4}$. This converter unit $CNV_U$ includes twelve freewheel diodes $D_{UR1}$, $D_{UR2}$, $D_{UR3}$, $D_{UR4}$, $D_{US1}$, $D_{US2}$, $D_{US3}$, $D_{US4}$, $D_{UT1}$, $D_{UT2}$, $D_{UT3}$ and $D_{UT4}$. These freewheel diodes are connected to all switching elements by way of anti-parallel connection on a one-on-one basis. Further, the converter unit $CNV_U$ includes six clamp diodes $D_{UR5}$, $D_{UR6}$, $D_{US5}$, $D_{US6}$, $D_{UT5}$ and $D_{UT6}$ connected to the neutral point of this converter unit $CNV_U$ side.

More specifically, the switching elements $S_{UR1}$, $S_{UR2}$, $S_{UR3}$ and $S_{UR4}$, the freewheel diodes $D_{UR1}$, $D_{UR2}$, $D_{UR3}$ and $D_{UR4}$ and the clamp diodes $D_{UR5}$ and $D_{UR6}$ configure the leg of the R phase of the converter unit $CNV_U$.

The switching elements $S_{UR1}$, $S_{UR2}$, $S_{UR3}$ and $S_{UR4}$ are connected in series in order of the switching elements $S_{UR1}$, $S_{UR2}$, $S_{UR3}$ and $S_{UR4}$ from the high potential side of the converter unit $CNV_U$ to the low potential side.

An anode of the clamp diode $D_{UR5}$ is connected to the neutral point of the converter unit $CNV_U$ side. A cathode of the clamp diode $D_{UR5}$ is connected to a connection point of the switching elements $S_{UR1}$ and $S_{UR2}$. Further, a cathode of the clamp diode $D_{UR6}$ is connected to the neutral point of the converter unit $CNV_U$ side. An anode of the clamp diode $D_{UR6}$ is connected to a connection point of the switching elements $S_{UR3}$ and $S_{UR4}$.

The switching element $S_{UR1}$ is connected with the freewheel diode $D_{UR1}$ by way of anti-parallel connection, and the switching element $S_{UR2}$ is connected with the freewheel diode $D_{UR2}$ by way of anti-parallel connection. Further, the switching element $S_{UR3}$ is connected with the freewheel diode $D_{UR3}$ by way of anti-parallel connection, and the switching element $S_{UR4}$ is connected with the freewheel diode $D_{U A4}$ by way of anti-parallel connection.

Furthermore, the switching elements $S_{US1}$, $S_{US2}$, $S_{US3}$ and $S_{US4}$, the freewheel diodes $D_{US1}$, $D_{US2}$, $D_{US3}$ and $D_{US4}$ and the clamp diodes $D_{US5}$ and $D_{US6}$ configure a leg of the S phase of the converter unit $CNV_U$. More specifically, the switching elements $S_{US1}$, $S_{US2}$, $S_{US3}$ and $S_{US4}$ are connected in series in order of the switching elements $S_{US1}$, $S_{US2}$, $S_{US3}$ and $S_{US4}$ from the high potential side of the converter unit $CNV_U$ to the low potential side.

An anode of the clamp diode $D_{US5}$ is connected to the neutral point of the converter unit $CNV_U$ side. A cathode of the clamp diode $D_{UB5}$ is connected to a connection point of the switching elements $S_{US1}$ and $S_{US2}$. A cathode of the clamp diode $D_{US6}$ is connected to the neutral point of the converter unit $CNV_U$ side. An anode of the clamp diode $D_{US6}$ is connected to a connection point of the switching elements $S_{US3}$ and $S_{US4}$.

The switching element $S_{US1}$ is connected with the freewheel diode $D_{US1}$ by way of anti-parallel connection, and the switching element $S_{US2}$ is connected with the freewheel diode $D_{US2}$ by way of anti-parallel connection. Further, the switching element $S_{US3}$ is connected with the freewheel diode $D_{US3}$ by way of anti-parallel connection, and the switching element $S_{US4}$ is connected with the freewheel diode $D_{US4}$ by way of anti-parallel connection.

Furthermore, the switching elements $S_{UT1}$, $S_{UT2}$, $S_{UT3}$ and $S_{UT4}$, the freewheel diodes $D_{UT1}$, $D_{UT2}$, $D_{UT3}$ and $D_{UT4}$ and the clamp diodes $D_{UT5}$ and $D_{UT6}$ configure a leg of the T phase of the converter unit $CNV_U$. More specifically, the switching elements $S_{UT1}$, $S_{UT2}$, $S_{UT3}$ and $S_{UT4}$ are connected in series in order of the switching elements $S_{UT1}$, $S_{UT2}$, $S_{UT3}$ and $S_{UT4}$ from the high potential side of the converter unit $CNV_U$ to the low potential side.

An anode of the clamp diode $D_{UT5}$ is connected to the neutral point of the converter unit $CNV_U$ side. A cathode of the clamp diode $D_{UT5}$ is connected to a connection point of the switching elements $S_{UT1}$ and $S_{UT2}$. Further, a cathode of the clamp diode $D_{UT6}$ is connected to the neutral point of the converter unit $CNV_U$ side. An anode of the clamp diode $D_{UT6}$ is connected to a connection point of the switching elements $S_{UT3}$ and $S_{UT4}$.

The switching element $S_{UT1}$ is connected with the freewheel diode $D_{UT1}$ by way of anti-parallel connection, and the switching element $S_{UT2}$ is connected with the freewheel diode $D_{UT2}$ by way of anti-parallel connection. The switching element $S_{UT3}$ is connected with the freewheel diode $D_{UT3}$ by way of anti-parallel connection, and the switching element $S_{UT4}$ is connected with the freewheel diode $D_{UT4}$ by way of anti-parallel connection.

That is, the converter unit $CNV_U$ is a three-phase NPC electric power converting device in which the three legs are configured by connecting in series the switching elements $S_{UR1}$, $S_{UR2}$, $S_{UR3}$ and $S_{UR4}$ of the R phase, the switching elements $S_{US1}$, $S_{US2}$, $S_{US3}$ and $S_{US4}$ of the S phase and the switching elements $S_{UT1}$, $S_{UT2}$, $S_{UT3}$ and $S_{UT4}$ of the T phase.

In addition, a three-phase voltage consisting of a connection point potential $V_{UR}$ of the R phase of the converter unit $CNV_U$, a connection point potential $V_{US}$ of the leg of the S phase and the connection point potential $V_{UT}$ of the leg of the T phase is output to a DC winding wire of the converter transformer $T_{RU}$.

The connection point potential $V_{UR}$ is a connection point potential of the switching elements $S_{UR2}$ and $S_{UR3}$ of the leg of the R phase of the converter unit $CNV_U$. The connection point potential $V_{US}$ is a connection point potential of the switching elements $S_{US2}$ and $S_{US3}$ of the leg of the S phase of the converter unit $CNV_U$. Further, the connection point potential $V_{UT}$ is a connection point potential of the switching elements $S_{UT2}$ and $S_{UT3}$ of the leg of the T phase of the converter unit $CNV_U$.

In the present embodiment, by connecting the converter unit $CNV_U$ to the DC winding wire of the converter transformer $T_{RU}$ by Δ wire connection, line voltages of $V_{UR}$–$V_{US}$, $V_{US}$–$V_{UT}$ and $V_{UT}$–$V_{UR}$ of the three phases are output to the AC winding wire side of the converter transformer $T_{RU}$.

Configurations of the electric power converting device of the V phase and the W phase are the same as that of the electric power converting device of the U phase.

Although not illustrated in detail, the inverter unit $INV_V$ of the V phase includes eight switching elements $S_{VA1}$, $S_{VA2}$, $S_{VA3}$, $S_{VA4}$, $S_{VB1}$, $S_{VB2}$, $S_{VB3}$ and $S_{VB4}$. Further, this inverter unit $INV_V$ includes eight freewheel diodes $D_{VA1}$, $D_{VA2}$, $D_{VA3}$, $D_{VA4}$, $D_{VB1}$, $D_{VB2}$, $D_{VB3}$ and $D_{VB4}$. Furthermore, the inverter unit $INV_V$ includes four clamp diodes $D_{VA5}$, $D_{VA6}$, $D_{VB5}$ and $D_{VB6}$ connected to the neutral point.

Still further, the inverter unit $INV_W$ of the W phase includes eight switching elements $S_{WA1}$, $S_{WA2}$, $S_{WA3}$, $S_{WA4}$, $S_{WB1}$, $S_{WB2}$, $S_{WB3}$ and $S_{WB4}$. Moreover, this inverter unit $INV_V$ includes eight freewheel diodes $D_{WA1}$, $D_{WA2}$, $D_{WA3}$, $D_{WA4}$, $D_{WB1}$, $D_{WB2}$, $D_{WB3}$ and $D_{WB4}$ connected to all switching elements by way of anti-parallel connection. Further, the inverter unit $INV_U$ includes four clamp diodes $D_{WA5}$, $D_{WA6}$, $D_{WB5}$ and $D_{WB6}$ connected to the neutral point.

Furthermore, the converter unit $CNV_V$ of the V phase includes twelve switching elements $S_{VR1}$, $S_{VR2}$, $S_{VR3}$, $S_{VR4}$, $S_{VS1}$, $S_{VS2}$, $S_{VS3}$, $S_{VS4}$, $S_{VT1}$, $S_{VT2}$, $S_{VT3}$ and $S_{VT4}$. This converter unit $CNV_V$ includes twelve freewheel diodes $D_{VR1}$, $D_{VR2}$, $D_{VR3}$, $D_{VR4}$, $D_{VS1}$, $D_{VS2}$, $D_{VS3}$, $D_{VS4}$, $D_{VT1}$, $D_{VT2}$, $D_{VT3}$ and $D_{VT4}$. Further, the converter unit $CNV_U$ includes six clamp diodes $D_{VR5}$, $D_{VR6}$, $D_{VS5}$, $D_{VS6}$, $D_{VT5}$ and $D_{VT6}$ connected to the neutral point of this converter unit $CNV_U$ side.

Furthermore, the converter unit $CNV_W$ of the W phase includes twelve switching elements $S_{WR1}$, $S_{WR2}$, $S_{WR3}$, $S_{WR4}$, $S_{WS1}$, $S_{WS2}$, $S_{WS3}$, $S_{WS4}$, $S_{WT1}$, $S_{WT2}$, $S_{WT3}$ and $S_{WT4}$. This converter unit $CNV_W$ includes twelve freewheel diodes $D_{WR1}$, $D_{WR2}$, $D_{WR3}$, $D_{WR4}$, $D_{WS1}$, $D_{WS2}$, $D_{WS3}$, $D_{WS4}$, $D_{WT1}$, $D_{WT2}$, $D_{WT3}$ and $D_{WT4}$. Further, the converter unit $CNV_W$ includes six clamp diodes $D_{WR5}$, $D_{WR6}$, $D_{WS5}$, $D_{WS6}$, $D_{WT5}$ and $D_{WT6}$ connected to the neutral point of this converter unit $CNV_W$ side.

An operation of the present embodiment employing the above-described configuration will be described in detail.

First, a method of outputting a voltage from an inverter unit will be described using the inverter unit $INV_U$ of the U phase as an example.

The inverter unit $INV_U$ employs a full-bridge configuration. Consequently, when a DC voltage of the inverter unit $INV_U$ is $V_{DC}$, the inverter unit $INV_U$ can output DC voltages of five levels consisting of $-V_{DC}$, $-V_{DC}/2$, 0, $+V_{DC}/2$ and $+V_{DC}$.

Next, a method of driving the switching elements $S_{UA1}$, $S_{UA2}$, $S_{UA3}$, $S_{UA4}$, $S_{UB1}$, $S_{UB2}$, $S_{UB3}$ and $S_{UB4}$ of the inverter unit $INV_U$ will be described.

In the present embodiment, a control device 10 is provided as illustrated in FIG. 1. This control device 10 includes an inverter control unit 11 which controls the inverter units and a converter control unit 12 which controls the converter units.

The inverter control unit 11 controls on/off of the switching elements of the inverter units.

The inverter control unit 11 controls on/off of the switching elements $S_{UA1}$, $S_{UA2}$, $S_{UA3}$, $S_{UA4}$, $S_{UB1}$, $S_{UB2}$, $S_{UB3}$ and $S_{UB4}$, and the inverter unit $INV_U$ outputs the potential difference $V_{UA} - V_{UB}$ to the three-phase electric motor 2. As this output, the above-described voltages of five levels, that is, $-V_{DC}$, $-V_{DC}/2$, 0, $+V_{DC}/2$ and $+V_{DC}$ are applied to the three-phase electric motor 2.

FIG. 2 is a view illustrating a table format of an example of a relationship between output voltages of an inverter unit of the electric power converting device and switching element states according to the embodiment.

FIG. 2 illustrates patterns of correspondence relationships between on/off states and output voltages (DC voltages) of the switching elements $S_{UA1}$, $S_{UA2}$, $S_{UA3}$, $S_{UA4}$, $S_{UB1}$, $S_{UB2}$, $S_{UB3}$ and $S_{UB4}$ of the inverter unit $INV_U$. The number of these patterns is nine.

Further, as illustrated in FIG. 2, when the switching element $S_{UA1}$ is on, the switching element $S_{UA3}$ is off. Furthermore, when the switching element $S_{UA2}$ is on, the switching element $S_{UA4}$ is off. Still further, when the switching element $S_{UB1}$ is on, the switching element $S_{UB3}$ is off. Moreover, when the switching element $S_{UB2}$ is on, the switching element $S_{UB4}$ is off.

Thus, according to the present embodiment, the inverter control unit 11 causes complementary operations of the switching elements $S_{UA1}$ and $S_{UA3}$ of the first leg in the inverter unit $INV_U$, and causes complementary operations of the switching elements $S_{UA2}$ and $S_{UA4}$ of the first leg in the inverter unit $INV_U$. Thus, according to the present embodiment, the inverter control unit 11 causes complementary operations of the switching elements $S_{UB1}$ and $S_{UB3}$ of the second leg in the inverter unit $INV_U$, and causes complementary operations of the switching elements $S_{UB2}$ and $S_{UB4}$ of the second leg in the inverter unit $INV_U$.

As illustrated in FIG. 2, there are three output patterns of 0 voltage. Further, there are two output patterns of $-V_{DC}/2$ and two output patterns of $+V_{DC}/2$. That is, output patterns of 0 voltage, $-V_{DC}/2$ and $+V_{DC}/2$ have redundancy.

In the present embodiment, a method of outputting a PWM voltage $V_{UA} - V_{UB}$ corresponding to an inverter U phase voltage command value $V_U^*$ from the inverter control unit 11 of the control device 10 using triangle wave carrier modulation will be described.

Figure 3:
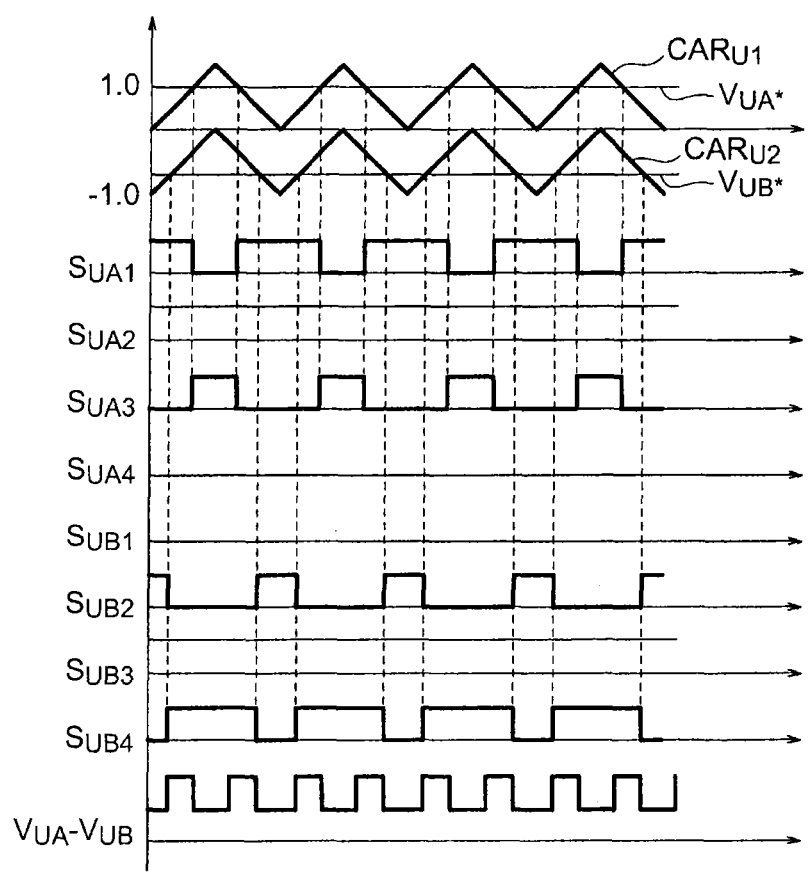
FIG. 3 is a timing chart illustrating an example of a relationship between an output voltage of the inverter unit of the electric power converting device and switching element states according to the embodiment.

FIG. 3 is a timing chart illustrating an example of a relationship between an output voltage of the inverter unit of the electric power converting device and switching element states according to the embodiment.

The timing chart in FIG. 3 is a timing chart illustrating relationships between a state of a carrier modulated wave of the inverter unit $INV_U$ and on/off states of the switching elements $S_{UA1}$, $S_{UA2}$, $S_{UA3}$, $S_{UA4}$, $S_{UB1}$, $S_{UB2}$, $S_{UB3}$ and $S_{UB4}$ of the inverter unit $INV_U$.

The inverter control unit 11 generates two triangle waves $CAR_{U1}$ and $CAR_{U2}$ at a predetermined carrier frequency. Further, the inverter control unit 11 outputs voltage command values $V_{UA}^*$ and $V_{UB}^*$ of the inverter unit $INV_U$. Furthermore, the inverter control unit 11 compares the triangle waves $CAR_{U1}$ and $CAR_{U2}$ and the voltage command values $V_{UA}^*$ and $V_{UB}^*$ of the inverter unit $INV_U$, and generates switching patterns of the eight switching elements $S_{UA1}$, $S_{UA2}$, $S_{UA3}$, $S_{UA4}$, $S_{UB1}$, $S_{UB2}$, $S_{UB3}$ and $S_{UB4}$ of the inverter unit $INV_U$.

In addition, the voltage command value $V_{UA}^*$ matches the inverter U phase voltage command value $V_U^*$. Further, the voltage command value $V_{UB}^*$ matches a value obtained by inverting the inverter U phase voltage command value $V_U^*$. That is, $V_{UA}^* = V_U^*$ holds and $V_{UB}^* = -V_U^*$ holds.

In the present embodiment, a maximum value of the voltage command value $V_U^*$ is 1.0, and a minimum value of the voltage command value $V_U^*$ is $-1.0$. Then, a region of the voltage command value $V_U^*$ is supported by two regions consisting of a region of a value of the triangle wave $CAR_{U1}$ and a region of a value of the triangle $CAR_{U2}$. In the present embodiment, a maximum value of the triangle wave $CAR_{U1}$ is 1.0, and a minimum value is 0.0. Further, the maximum value of the triangle wave $CAR_{U2}$ is 0.0, and a minimum value is $-1.0$.

FIG. 3 illustrates an example of operation states of the switching elements $S_{Um}$, $S_{UA3}$, $S_{UA2}$, $S_{UA4}$, $S_{UB1}$, $S_{UB3}$, $S_{UB2}$ and $S_{UB4}$ when the voltage command $V_U^*$ is between 0.5 and 1.0.

Hereinafter, an operation of the switching element of the inverter unit $INV_U$ with respect to each triangle wave will be described in detail.

The inverter control unit 11 turns on the switching element $S_{UA1}$ and turns off the switching element $S_{UA3}$ when the voltage command value $V_{UA}^*$ is higher than the triangle wave $CAR_{U1}$. The inverter control unit 11 turns off the switching element $S_{UA1}$ and turns on the switching element $S_{UA3}$ when the voltage command value $V_{UA}^*$ is lower than the triangle wave $CAR_{U1}$.

The inverter control unit 11 turns on the switching element $S_{UA2}$ and turns off the switching element $S_{UA4}$ when the voltage command value $V_{UA}^*$ is higher than the triangle wave $CAR_{U2}$. The inverter control unit 11 turns off the switching element $S_{UA2}$ and turns on the switching element $S_{UA4}$ when the voltage command value $V_{UA}^*$ is lower than the triangle wave $CAR_{U2}$.

Further, the inverter control unit 11 turns on the switching element $S_{UB1}$ and turns off the switching element $S_{UB3}$ when the voltage command value $V_{UB}^*$ is higher than the triangle wave $CAR_{U1}$. The inverter control unit 11 turns off the switching element $S_{UB1}$ and turns on the switching element $S_{UB3}$ when the voltage command value $V_{UB}^*$ is lower than the triangle wave $CAR_{U1}$.

The inverter control unit 11 turns on the switching element $S_{UB2}$ and turns off the switching element $S_{UB4}$ when the voltage command value $V_{UB}^*$ is higher than the triangle wave $CAR_{U2}$. The inverter control unit 11 turns off the switching element $S_{UB2}$ and turns on the switching element $S_{UB4}$ when the voltage command value $V_{UB}^*$ is lower than the triangle wave $CAR_{U2}$.

More specifically, as indicated at a left end portion of the timing chart in FIG. 3, when the voltage command value $V_{UA}^*$ is higher than the triangle waves $CAR_{U1}$ and $CAR_{U2}$, and the voltage command value $V_{UB}^*$ is lower than the triangle wave $CAR_{U1}$ and is higher than the triangle wave $CAR_{U2}$, the inverter control unit 11 turns on the switching elements $S_{UA1}$, $S_{UA2}$, $S_{UB2}$ and $S_{UB3}$ and turns off the switching elements $S_{UA3}$, $S_{UA4}$, $S_{UB1}$ and $S_{UB4}$.

This switching pattern corresponds to a pattern "2" illustrated in FIG. 2. Consequently, the output voltage is $+V_{DC}/2$. The patterns "1" to "3" illustrated in FIG. 2 appear when the voltage command value $V_U^*$ is higher than 0. Further, the patterns "7" to "9" illustrated in FIG. 2 appear when the voltage command value $V_U^*$ is lower than 0.

According to the above operation, the inverter unit $INV_U$ can output the PWM voltage $V_{UA}-V_{UB}$ corresponding to the inverter U phase voltage command value $V_U^*$.

Further, a phase of the voltage command value for the inverter unit $INV_U$, a phase of the voltage command value for the inverter unit $INV_V$ and a phase of the voltage command value for the inverter unit $INV_W$ are shifted 120 degrees, respectively.

Thus, except that the phases of the voltage command values are shifted, the operations of the inverter units $INV_U$, $INV_V$ and $INV_W$ are common.

Next, a method of outputting a voltage from a converter unit will be described using the converter unit $CNV_U$ of the U phase as an example. A method of outputting a voltage from the converter unit $CNV_V$ of the V phase and a method of outputting a voltage from the converter unit W are the same as the method of outputting the voltage from the converter unit $CNV_U$. This method of outputting the voltage from a converter unit indicates a remarkable feature of the present embodiment compared to the old technique. By using this voltage outputting method, it is possible to control on/off of switching elements of converter units, and reduce fluctuation of a DC link voltage.

The converter unit $CNV_U$ employs the three-phase half-bridge configuration, and therefore a method of outputting a voltage from each phase of the electric power system will be described as a leg which outputs a R phase voltage of the system voltage.

The R phase leg of the converter unit $CNV_U$ controls on/off of the switching elements $S_{UR1}$, $S_{UR2}$, $S_{UR3}$ and $S_{UR4}$ and outputs the voltage $V_{UR}$. In this case, DC voltages are voltages of three levels consisting of $-V_{DC}/2$, 0 and $+V_{DC}/2$.

Figures 4, 5:
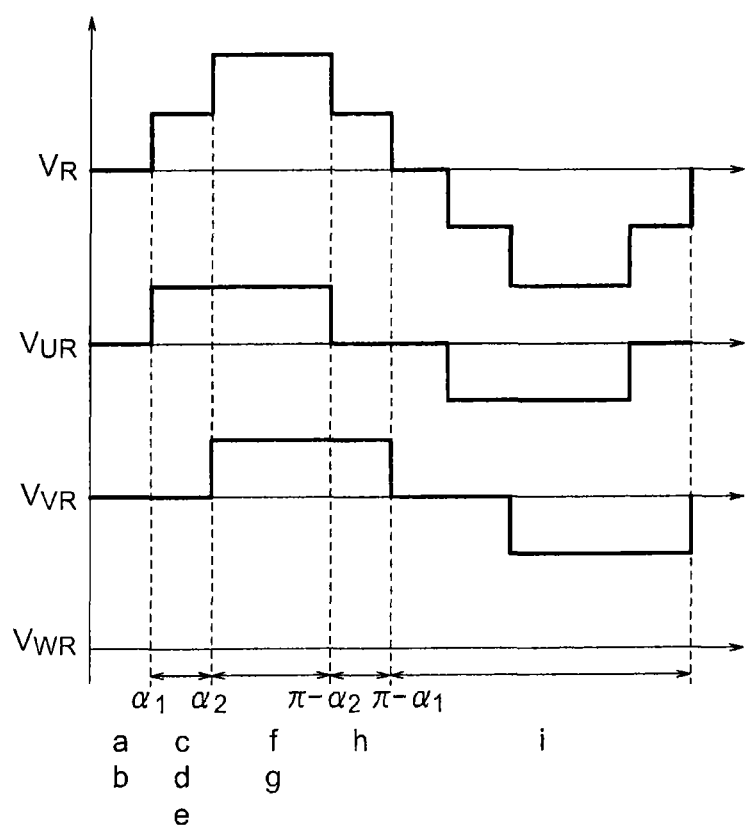
FIG. 4 is a view illustrating a table format of an example of a relationship between an output voltage of a converter unit of the electric power converting device and switching element states according to the embodiment.
FIG. 5 is a timing chart illustrating an example of a relationship between an output voltage of the converter unit of the electric power converting device and switching element states according to the embodiment.

FIG. 4 is a view illustrating a table format of an example of a relationship between an output voltage of a converter unit of the electric power converting device and switching element states according to the embodiment.

FIG. 4 illustrates on/off states of the switching elements $S_{UR1}$, $S_{UR2}$, $S_{UR3}$ and $S_{UR4}$ determined per output voltage. As illustrated in FIG. 4, there are three patterns of these on/off states.

Further, in the present embodiment, the converter control unit 12 of the control device 10 turns off the switching element $S_{UR3}$ when turning on the switching element $S_{UR1}$. The converter control unit 12 turns on the switching element $S_{UR3}$ when turning off the switching element $S_{UR1}$. Further, the converter control unit 12 turns off the switching element $S_{UR4}$ when turning on the switching element $S_{UR2}$. The converter control unit 12 turns on the switching element $S_{UR4}$ when turning off the switching element $S_{UR2}$.

Thus, in the present embodiment, the converter control unit 12 causes complementary operations of the switching elements $S_{UR1}$ and $S_{UR3}$ of the leg of the R phase of the converter unit $CNV_U$, and causes complementary operations of the switching elements $S_{UR2}$ and $S_{UR4}$ of the leg of the R phase of the converter unit $CNV_U$.

Next, a method of outputting an R phase voltage $V_R$ including the converter units $CNV_U$, $CNV_V$ and $CNV_W$ will be described. FIG. 5 is a timing chart illustrating an example of a relationship between an output voltage of the converter unit of the electric power converting device and switching element states according to the embodiment.

FIG. 5 illustrates a timing chart of the output voltages $V_{UR}$, $V_{VR}$ and $V_{SR}$ of the R phases of the converter units $CNV_U$, $CNV_V$ and $CNV_W$ of the respective phases, and the R phase voltage $V_R$.

As described above, AC winding wires of the converter transformers $TR_U$, $TR_V$ and $TR_W$ of the respective phases are connected in series. Hence, the R phase voltage $V_R$ is calculated based on the output voltages of the R phases of the converter units $CNV_U$, $CNV_V$ and $CNV_W$ of the respective phases.

When a winding wire ratio of the converter transformers $TR_U$, $TR_V$ and $TR_W$ is DC winding wire:AC winding wire=1: N, $V_R = N \times (V_{UR} + V_{VR} + V_{WR})$ holds.

Points of time at which below operations a to i are performed correspond to symbols a to i described in FIG. 5.

For example, the point of time at which the operation a is performed is a point of time of the symbol a illustrated in FIG. 5. Further, methods of performing operations upon a power running operation and a regenerative operation will be separately described.

Figure 6:
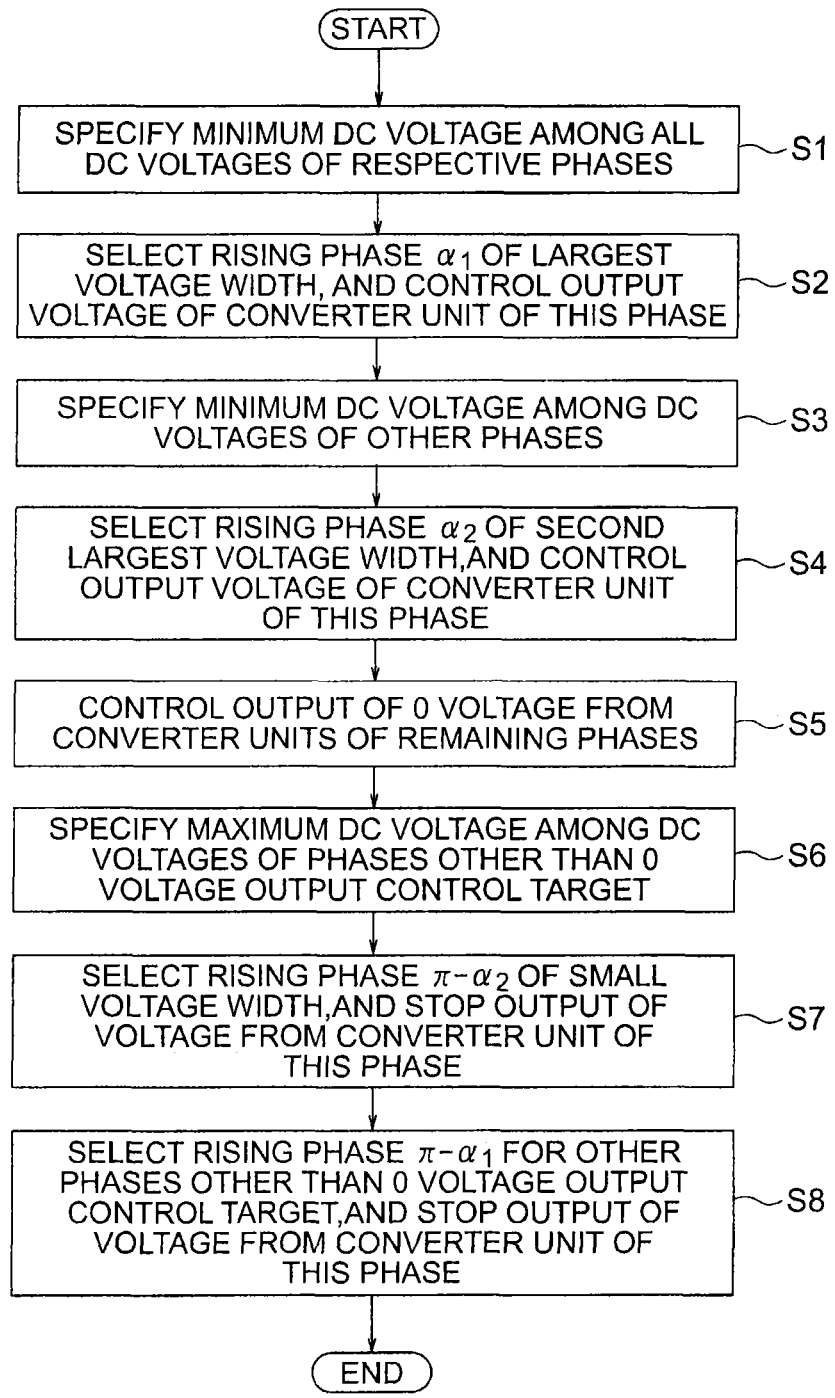
FIG. 6 is a flowchart illustrating an example of process of control upon a power running operation of the converter unit of the power electric power converting device according to the embodiment.

First, an operation of performing the power running operation that electric power flows in from the electric power system will be described with reference to FIG. 6.

First, the determining unit 12a of the converter control unit 12 of the control device 10 acquires all DC voltages $V_{DCUP}$, $V_{DCUN}$, $V_{DCVP}$, $V_{DCVN}$, $V_{DCWP}$ and $V_{DCWN}$ corresponding to respective voltages of DC link capacitors of the converter units $CNV_U$, $CNV_V$ and $CNV_W$ of the respective phases. The determining unit 12a specifies a minimum DC voltage among these DC voltages (step S1). This DC voltage is a voltage of the most significant fluctuation compared to an average of the respective phases. This specifying time is a timing of a in FIG. 5.

All DC voltages are the voltage $V_{DCUP}$ of the DC link capacitor $C_{UP}$ of the converter unit $CNV_U$ side, the voltage $V_{DCUN}$ of the DC link capacitor $C_{UN}$ of the converter unit $CNV_U$ side, the voltage $V_{DCVP}$ of the DC link capacitor $C_{VP}$ of the converter unit $CNV_V$, the voltage $V_{DCVN}$ of the DC link capacitor $C_{VN}$ of the converter unit $CNV_V$ side, the voltage $V_{DCWP}$ of the DC link capacitor $C_{WP}$ of the converter unit $CNV_W$ side, and the voltage $V_{DCWN}$ of the DC link capacitor $C_{WN}$ of the converter unit $CNV_W$ side.

In the present embodiment, the voltage $V_{DCUP}$ of the DC link capacitor $C_{UP}$ of the converter unit $CNV_U$ side of the U phase is a minimum value.

In this case, it is necessary to make the voltage $V_{DCUP}$ close to an average value of all DC voltages by causing an inflow of electric power from the converter unit $CNV_U$ to the DC link capacitor $C_{UP}$ of the U phase. Further, the inflow electric power is represented by a product of an output voltage and an electric current. Consequently, the converter unit $CNV_U$ needs to output as high a voltage as possible to the DC link capacitor side. That is, as illustrated in FIG. 5, the phase selecting unit 12b of the converter control unit 12 selects a rising phase $\alpha_1$ of the largest voltage width as a phase of the output voltage $V_{UR}$ of the R phase from the converter unit $CNV_U$. This voltage width means duration of time from a rising to a falling in the timing chart illustrated in FIG. 5. The converter control unit 12 controls on/off of the switching elements $S_{UR1}$, $S_{UR2}$, $S_{UR3}$ and $S_{UR4}$ such that a waveform of the output voltage $V_{UR}$ becomes a waveform corresponding to this selected phase $\alpha_1$ (step S2). The switching pattern in this case corresponds to the pattern "1" illustrated in FIG. 4. In this case, a DC voltage from the converter unit is $+V_{DC}/2$ as illustrated in FIG. 4. This operation is the operation b in FIG. 5.

Further, the determining unit 12a of the converter control unit 12 specifies a minimum DC voltage among the DC voltages $V_{DCVP}$, $V_{DCVN}$, $V_{DCWP}$ and $V_{DCWN}$ of the V phase and the W phase other than this U phase (step S3). This minimum DC voltage is a voltage of the most significant fluctuation compared to an average of the respective phases among the DC voltages $V_{DCVP}$, $V_{DCVN}$, $V_{DCWP}$ and $V_{DCWN}$. This operation is the operation c in FIG. 5. In the present embodiment, the DC voltage $V_{DCVP}$ of the DC link capacitor $C_{VP}$ of the converter unit $CNV_V$ side of the V phase is a minimum value.

In this case, it is necessary to make the DC voltage $V_{DCVP}$ of the DC link capacitor $C_{VP}$ of the V phase close to an average value by causing an inflow of electric power from the converter unit $CNV_U$ to the DC link capacitor $C_{VP}$ of the V phase. As described above, the electric power which flows in the converter unit is represented by a product of an output voltage and an electric current. Consequently, the converter unit $CNV_U$ needs to output as high a voltage as possible to the DC link capacitor side. That is, as illustrated in FIG. 5, the phase selecting unit 12b of the converter control unit 12 selects a rising phase $\alpha_2$ of the second largest voltage width as a phase of the output voltage $V_{VR}$ of the R phase from the converter unit $CNV_U$. The converter control unit 12 controls on/off of the switching elements $S_{VR1}$, $S_{VR2}$, $S_{VR3}$ and $S_{VR4}$ such that a waveform of the output voltage $V_{VR}$ becomes a waveform corresponding to this selected phase $\alpha_2$ (step S4). The switching pattern in this case corresponds to the pattern "1" illustrated in FIG. 4. This operation is the operation d in FIG. 5.

Further, the converter control unit 12 controls on/off of the switching elements $S_{WR1}$, $S_{WR2}$, $S_{WR3}$ and $S_{WR4}$ such that the voltage is not output from the converter unit $CNV_W$ of the remaining W phase (step S5). The switching pattern in this case corresponds to the pattern "2" illustrated in FIG. 4. This operation is the operation e in FIG. 5. That is, 0 voltage is output from the converter unit $CNV_W$, and therefore electric power does not flow in the DC link capacitors $C_{WP}$ and $C_{WN}$ of the converter unit $CNV_W$ side.

Further, the determining unit 12a of the converter control unit 12 specifies a maximum DC voltage among the DC voltages $V_{DCUP}$, $V_{DCUN}$, $V_{DCUP}$ and $V_{DCUN}$ of the U phase and the V phase other than this W phase (step S6). This maximum DC voltage is a voltage of the most significant fluctuation compared to an average of the respective phases among the DC voltages $V_{DCUP}$, $V_{DCUN}$, $V_{DCVP}$ and $V_{DCVN}$. This specifying time is a timing of f in FIG. 5. In the present embodiment, the DC voltage $V_{DCUP}$ is a maximum value.

In this case, it is necessary to stop an inflow of electric power from the electric power system to the converter unit $CNV_U$, and make the DC voltage $V_{DCUP}$ of the DC link capacitor $C_{UP}$ of the U phase close to an average value. Hence, the phase selecting unit 12b of the converter control unit 12 selects a falling phase $\pi-\alpha_2$ of a small voltage width as the phase of the output voltage $V_{UR}$ of the R phase from the converter unit $CNV_U$ such that an output of the voltage from the converter unit $CNV_U$ stops. The converter control unit 12 controls on/off of the switching elements $S_{UR1}$, $S_{UR2}$, $S_{UR3}$ and $S_{UR4}$ such that a waveform of the output voltage $V_{UR}$ becomes a waveform corresponding to this selected phase (step S7). The switching pattern in this case corresponds to the pattern "2" illustrated in FIG. 4. This operation is the operation g in FIG. 5.

Further, the phase selecting unit 12b of the converter control unit 12 selects a falling phase $\pi-\alpha_1$ of a large voltage width as the phase of the output voltage $V_{VR}$ of the R phase from the converter unit $CNV_U$ such that an output of the voltage from the converter unit $CNV_U$ stops. The converter control unit 12 controls on/off of the switching elements $S_{VR1}$, $S_{VR2}$, $S_{VR3}$ and $S_{VR4}$ such that a waveform of the output voltage $V_{VR}$ becomes a waveform corresponding to this selected phase (step S8). The switching pattern in this case corresponds to the pattern "2" illustrated in FIG. 4. This operation is the operation h in FIG. 5.

The converter control unit 12 controls the switching elements of the converter unit of each phase such that the same voltage as a voltage in a positive voltage output period is output from the converter unit of each phase to prevent bias magnetism of a transformer in a negative voltage output period. This operation is the operation i in FIG. 5.

Figure 7:
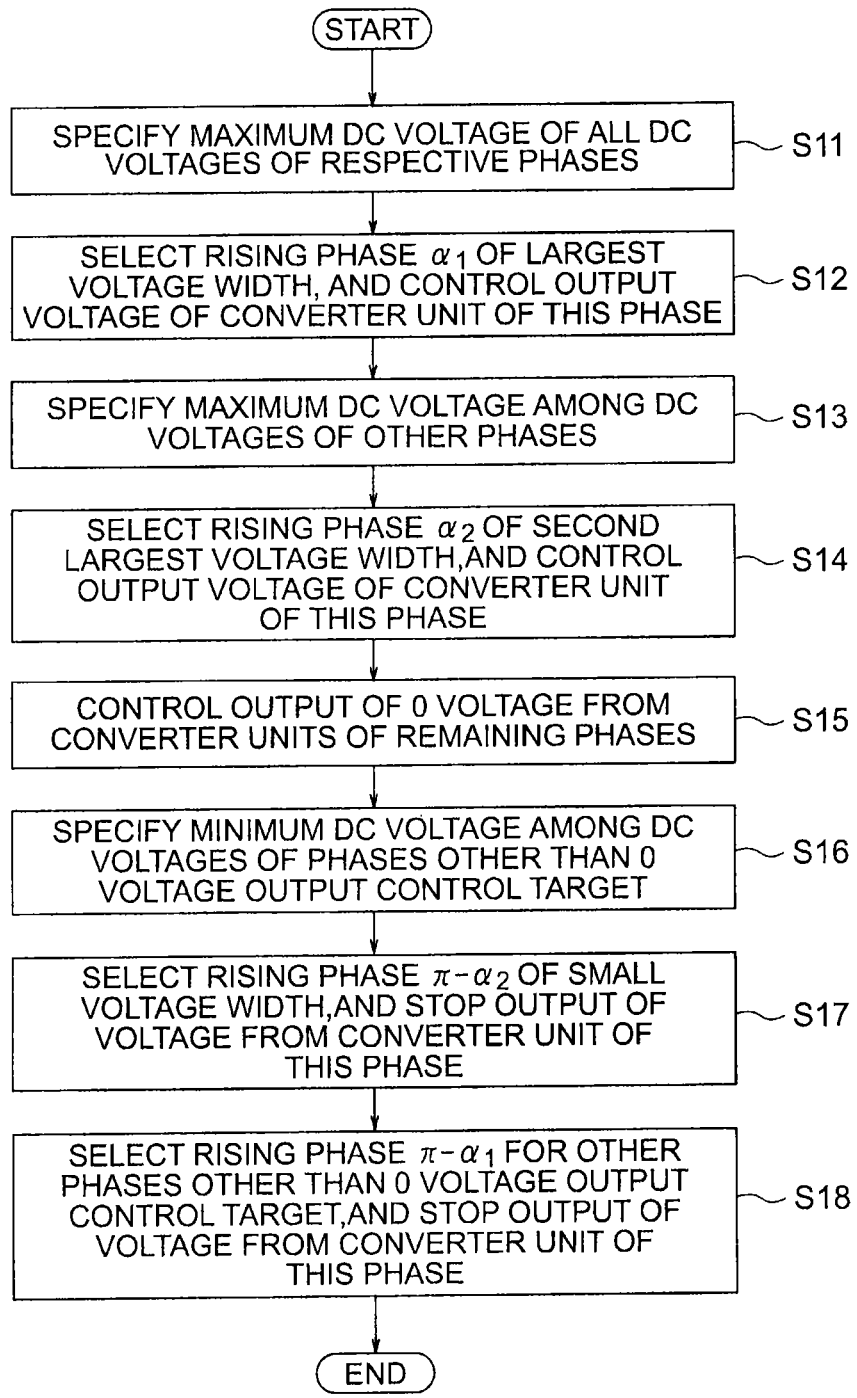
FIG. 7 is a flowchart illustrating an example of process of control upon a regenerative operation of the converter unit of the power electric power converting device according to the embodiment.

Next, an operation of performing the regenerative operation that electric power flows out to the electric power system will be described with reference to FIG. 7.

First, the determining unit 12a of the converter control unit 12 of the control device 10 acquires all DC voltages $V_{DCUP}$, $V_{DCUN}$, $V_{DCVP}$, $V_{DCVN}$, $V_{DCWP}$ and $V_{DCWN}$ corresponding to respective voltages of DC link capacitors of the converter units $CNV_U$, $CNV_V$ and $CNV_W$ of the respective phases. The determining unit 12a specifies a maximum DC voltage among these voltages (step S11). This DC voltage is a voltage of the most significant fluctuation compared to an average of the respective phases. In the present embodiment, the voltage $V_{DCUP}$ of the DC link capacitor $C_{UP}$ of the converter unit $CNV_U$ side of the U phase is a maximum value.

In this case, it is necessary to make the DC voltage $V_{DCUP}$ of the DC link capacitor $C_{UP}$ of the U phase close to an average value of all DC voltages by causing an outflow of electric power from the converter unit $CNV_U$ side to the electric power system. Further, the electric power which flows out from converter unit side to the electric power system is represented by a product of an output voltage and an electric current. Consequently, the converter unit $CNV_U$ needs to output as high a voltage as possible to the electric power system. That is, as illustrated in FIG. 5, the phase selecting unit 12b of the converter control unit 12 selects a rising phase $\alpha_1$ of the largest voltage width as a phase of the output voltage $V_{AR}$ of the R phase from the converter unit $CNV_U$. The converter control unit 12 controls on/off of the switching elements $S_{UR1}$, $S_{UR2}$, $S_{UR3}$ and $S_{UR4}$ such that a waveform of the output voltage $V_{UR}$ becomes a waveform corresponding to this selected phase $\alpha_1$ (step S12). The switching pattern in this case corresponds to the pattern "3" illustrated in FIG. 4. In this case, a DC voltage from the converter unit is $-V_{DC}/2$ as illustrated in FIG. 4.

Further, the determining unit 12a of the converter control unit 12 specifies a maximum DC voltage among the DC voltages $V_{DCVP}$, $V_{DCVN}$, $V_{DCWP}$ and $V_{DCWN}$ of the V phase and the W phase other than this U phase (step S13). This maximum DC voltage is a voltage of the most significant fluctuation compared to an average of the respective phases among the DC voltages $V_{DCVP}$, $V_{DCVN}$, $V_{DCWP}$ and $V_{DCWN}$. In the present embodiment, the DC voltage $V_{DCVP}$ of the converter unit $CNV_V$ side of the V phase is a maximum value.

In this case, it is necessary to make the DC voltage $V_{DCVP}$ of the DC link capacitor $C_{VP}$ of the V phase close to an average value by causing an outflow of electric power from the converter unit $CNV_V$ side to the electric power system. Further, as described above, the electric power which flows out from converter unit side to the electric power system is represented by a product of an output voltage and an electric current. Consequently, the converter unit $CNV_V$ needs to output as high a voltage as possible to the electric power system. That is, as illustrated in FIG. 5, the phase selecting unit 12b of the converter control unit 12 selects a rising phase $\alpha_2$ of the second largest voltage width as a phase of the output voltage $V_{VR}$ of the R phase from the converter unit $CNV_V$. The converter control unit 12 controls on/off of the switching elements $S_{VR1}$, $S_{VR2}$, $S_{UR3}$ and $S_{VR4}$ such that a waveform of the output voltage $V_{VR}$ becomes a waveform corresponding to this selected phase $\alpha_2$ (step S14). The switching pattern in this case corresponds to the pattern "3" illustrated in FIG. 4.

Further, the converter control unit 12 controls on/off of the switching elements $S_{WR1}$, $S_{WR2}$, $S_{WR3}$ and $S_{WR4}$ such that the voltage is not output from the converter unit $CNV_W$ of the remaining W phase to the electric power system (step S15). The switching pattern in this case corresponds to the pattern "2" illustrated in FIG. 4. That is, 0 voltage is output from the converter unit $CNV_W$, and therefore electric power does not flow in the DC link capacitors $C_{WP}$ and $C_{WN}$ of the converter unit $CNV_W$ side.

Further, the determining unit 12a of the converter control unit 12 specifies a minimum DC voltage among the DC voltages $V_{DCUP}$, $V_{DCUN}$, $V_{DCVP}$ and $V_{DCVN}$ of the U phase and the V phase other than this W phase (step S16). This minimum DC voltage is a voltage of the most significant fluctuation compared to an average of the respective phases among the DC voltages $V_{DCUP}$, $V_{DCUN}$, $V_{DCVP}$ and $V_{DCVN}$. In the present embodiment, the DC voltage $V_{DCUP}$ of the converter unit $CNV_U$ side of the U phase is a minimum value.

In this case, it is necessary to stop an outflow of electric power from the converter unit $CNV_U$ to the electric power system, and make the DC voltage $V_{DCUP}$ of the DC link capacitor $C_{UP}$ of the U phase close to an average value. Hence, the phase selecting unit 12b of the converter control unit 12 selects a falling phase $\pi-\alpha_2$ of a small voltage width as the phase of the output voltage $V_{UR}$ of the R phase from the converter unit $CNV_U$ such that an output of the voltage from the converter unit $CNV_U$ stops. The converter control unit 12 controls on/off of the switching elements $S_{UR1}$, $S_{UR2}$, $S_{UR3}$ and $S_{UR4}$ such that a waveform of the output voltage $V_{UR}$ becomes a waveform corresponding to this phase (step S17). The switching pattern in this case corresponds to the pattern "2" illustrated in FIG. 4.

Further, the phase selecting unit 12b of the converter control unit 12 selects a falling phase $\pi-\alpha_1$ of a large voltage width as the phase of the output voltage $V_{VR}$ of the R phase from the converter unit $CNV_U$ such that an output of the voltage from the converter unit $CNV_U$ stops. The converter control unit 12 controls on/off of the switching elements $S_{VR1}$, $S_{VR2}$, $S_{VR3}$ and $S_{VR4}$ such that a waveform of the output voltage $V_{VR}$ becomes a waveform corresponding to this phase (step S18). The switching pattern in this case corresponds to the pattern "2" illustrated in FIG. 4.

The converter control unit 12 controls the switching elements of the converter unit of each phase such that the same voltage as a voltage in a positive voltage output period is output from the converter unit of each phase to prevent bias magnetism of a transformer in a negative voltage output period.

The rising phases $\alpha_1$ and $\alpha_2$ of the voltage are determined according to an output voltage amplitude. The R phase voltage $V_R$ output from the converter unit of each phase illustrated in FIG. 1 is expressed by following equation (1) by expanding Fourier series.

$$V_R = \frac{8NV_{DC}}{n\pi} \sum_{n=1,3,5...}^{\infty} \{\cos(n\alpha_1) + \cos(n\alpha_2)\}\sin(n\omega t) \qquad \text{Equation (1)}$$

Wherein n is a harmonic order, and is a fundamental wave voltage when n=1 holds. That is, the fundamental wave of the R phase voltage $V_R$ is expressed by following equation (2).

$$V_R = \frac{8NV_{DC}}{n\pi}\{\cos(\alpha_1) + \cos(\alpha_2)\}\sin(\omega t) \qquad \text{Equation (2)}$$

When the voltage amplitude is controlled to satisfy a given voltage use rate M (when a voltage peak value is $2V_{DC}$, M=1 holds), following equation (3) needs to be satisfied.

$$4\frac{\cos(\alpha_1) + \cos(\alpha_2)}{\pi} = M \qquad \text{Equation 3}$$

Thus, by changing the rising phases $\alpha_1$ and $\alpha_2$ of the voltage by the converter control unit 12 of the control device 10, it is possible to output the output voltage amplitude from the converter unit as an arbitrary value and control input/output electric power related to the converter unit. Further, by taking into account a difference between rising phases of the voltage from the converter unit, a harmonic of a specific order is reduced. When, for example, following equation (4) is satisfied, fifth and seventh-order harmonics can be reduced.

$$\alpha_1-\alpha_2=\pi/6 \qquad \text{Equation (4)}$$

That is, in the present embodiment, the rising phases $\alpha_1$ and $\alpha_2$ of the voltage which simultaneously satisfies equation (3) and equation (4) are calculated in advance according to the voltage use rate M expressed by equation (3). The converter control unit 12 of the control device 10 selects one of the rising phases $\alpha_1$ and $\alpha_2$ as a phase of the output voltage of each phase from the converter unit according to whether a DC voltage is high or low. By selecting the rising phase in this way, it is possible to output a converter voltage which simultaneously satisfies the voltage amplitude and reduction of a harmonic.

The above-described example where, in step S5 upon the power running operation, on/off of switching elements is controlled such that a converter unit of one remaining converter unit does not output a voltage after selecting the rising phases $\alpha_1$ and $\alpha_2$ of the voltage has been described. However, the present invention is not limited to this, and the converter control unit 12 of the control device 10 may select the rising phase $\alpha_3$ after selecting the rising phases $\alpha_1$ and $\alpha_2$ of the voltage, and control on/off of switching elements of one remaining phase such that a waveform becomes a waveform matching this phase.

Thus, when selecting the rising phase $\alpha_3$, the determining unit 12a of the converter control unit 12 specifies a maximum DC voltage among the DC voltages $V_{DCWP}$, $V_{DCUN}$, $V_{DCVP}$, $V_{DCVN}$, $V_{DCWP}$ and $V_{DCWN}$ of the respective phases instead of step S6. Further, the phase selecting unit 12b of the converter control unit 12 selects the falling phase $\pi-\alpha_3$ as the phase of the output voltage of the R phase from a converter unit such that an output of the voltage from the converter unit of a phase related to this specified voltage stops. The converter control unit 12 controls on/off of the switching elements such that a waveform becomes a waveform corresponding to this phase.

Further, the above-described example where, in step S15 upon the regenerative operation, on/off of switching elements is controlled such that a converter unit of one remaining converter unit does not output a voltage after selecting the rising phases $\alpha_1$ and $\alpha_2$ of the voltage has been described. However, the present invention is not limited to this, and the converter control unit 12 of the control device 10 may select the rising phase $\alpha_3$ after selecting the rising phases $\alpha_1$ and $\alpha_2$ of the voltage, and control on/off of switching elements of one remaining phase such that a waveform becomes a waveform matching this phase.

Thus, when selecting the rising phase $\alpha_3$, the determining unit 12a of the converter control unit 12 specifies a minimum DC voltage among the DC voltages $V_{DCUP}$, $V_{DCUN}$, $V_{DCUP}$, $V_{DCVN}$, $V_{DCWP}$ and $V_{DCWN}$ of the respective phases instead of step S16. Further, the phase selecting unit 12b of the converter control unit 12 selects the falling phase $\pi-\alpha_3$ as the phase of the output voltage of the R phase from a converter unit such that an output of the voltage from the converter unit of a phase related to this specified voltage stops. The converter control unit 12 controls on/off of the switching elements such that a waveform becomes a waveform corresponding to this phase.

The rising phases $\alpha_1$, $\alpha_2$ and $\alpha_3$ of the voltage are determined according to an output voltage amplitude. The R phase voltage $V_R$ output from the converter in FIG. 1 is expressed by following equation (5) by expanding Fourier series.

$$V_R = \frac{12NV_{DC}}{n\pi} \sum_{n=1,3,5...}^{\infty} \{\cos(n\alpha_1) + \cos(n\alpha_2) + \cos(n\alpha_3)\}\sin(n\omega t) \quad \text{Equation 5}$$

Wherein n is a harmonic order, and is a fundamental wave voltage when n=1 holds. That is, the fundamental wave of the R phase voltage $V_R$ is expressed by following equation (6).

$$V_R = \frac{12NV_{DC}}{n\pi}\{\cos(\alpha_1) + \cos(\alpha_2) + \cos(n\alpha_3)\}\sin(\omega t) \quad \text{Equation 6}$$

When the voltage amplitude is controlled to satisfy a given voltage use rate M (when a voltage peak value is $3V_{DC}$, M=1 holds), following equation (7) needs to be satisfied.

$$4\frac{\cos(\alpha_1) + \cos(\alpha_2) + \cos(\alpha_3)}{\pi} = M \quad \text{Equation 7}$$

Thus, by changing the rising phases $\alpha_1$, $\alpha_2$ and $\alpha_3$ of the voltage by the converter control unit 12, it is possible to output the output voltage amplitude as an arbitrary value and control input/output electric power related to the converter. Further, by taking into account a difference between rising phases of the voltage, a harmonic of a specific order is reduced. When, for example, following equation (8) and equation (9) are satisfied, it is possible to make the fifth and seventh-order harmonic 0 theoretically.

$$\cos(5\alpha_1)+\cos(5\alpha_2)+\cos(5\alpha_3)=0 \quad \text{Equation (8)}$$

$$\cos(7\alpha_1)+\cos(7\alpha_2)+\cos(7\alpha_3)=0 \quad \text{Equation (9)}$$

Similar to the voltage outputting method described above, it is possible to output a S phase voltage $V_S$ including the converter units $CNV_U$, $CNV_V$ and $CNV_W$ and output a T phase voltage $V_T$ including the converter units $CNV_U$, $CNV_V$ and $CNV_W$.

As described above, the electric power converting device according to the present embodiment controls on/off of switching elements of a converter such that a voltage which reduces fluctuation of a DC voltage corresponding to each phase of a three-phase AC load is output from the converter. By this means, in a situation in which an inverter outputs a low frequency voltage, it is possible to reduce fluctuation of a DC link voltage without increasing a capacity value of the DC link capacitor. Consequently, it is possible to achieve reduction of fluctuation of the DC link voltage, and then reduce a capacity value of the DC link capacitor.

According to the present embodiment, one pulse control is adopted to control converter units. This one pulse control refers to switching control which is performed once at one cycle of a voltage of each phase from a converter unit. Consequently, a voltage rising phase of a converter unit of each phase is classified into 0, $\alpha_1$ and $\alpha_2$ according to each phase of the U, V and W phases, so that it is possible to provide a degree of freedom of the voltage width of an output voltage of the converter unit of each phase.

According to the operation of the present embodiment, it is possible to control electric power which flows in from the electric power system to the converter unit of each phase and, consequently, reduce fluctuation of the DC link voltage. Further, it is possible to classify voltage rising phases into a plurality of phases, and, consequently, it is possible to both control an electric current which flows in the converter unit and reduce a harmonic by adjusting a voltage amplitude.

As a fringe effect, by adopting one pulse control, it is possible to contain the number of times of switching of converter units at minimum. Consequently, loss produced by switching elements of a converter unit becomes little, so that it is possible to make a cooler of the electric power converting device smaller.

Further, according to the present embodiment, the electric power converting device extracts a maximum value or a minimum value of all DC voltages $V_{DCUP}$, $V_{DCUN}$, $V_{DCVP}$, $V_{DCVN}$, $V_{DCVN}$, $V_{DCWP}$ and $V_{DCWN}$ corresponding to respective voltages of the DC link capacitors of the converter units $CNV_U$, $CNV_V$, $CNV_W$ of the respective phases, and preferentially compensates for electric power such that the extracted value becomes close to an average value of the respective phases. Consequently, it is possible to minimize fluctuation of a DC voltage.

Further, according to the present embodiment, the converter control unit 12 targets at suppressing fluctuation of the DC voltages $V_{DCUP}$, $V_{DCUN}$, $V_{DCVP}$, $V_{DCVN}$, $V_{DCWP}$ and $V_{DCWN}$ of the DC link capacitors segmented at the respective neutral points on the converter units $CNV_U$ side, $CNV_V$ side and $CNV_W$ side of the respective phases. Consequently, it is also possible to suppress fluctuation of neutral point potentials of converter units.

As described above, according to the present embodiment, the converter control unit 12 targets at suppressing fluctuation of DC voltages segmented at the neutral points of the converter units $CNV_U$ side, $CNV_V$ side and $CNV_W$ side of the respective phases. However, instead of this, the converter unit may target at suppressing fluctuation of three DC voltages including DC voltages of two DC link capacitors of the U phase, DC voltages of two DC link capacitors of the V phase and DC voltages of two DC link capacitors of the W phase without being segmented at neutral points.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electric power converting device comprising:
a converter which converts a three-phase AC voltage output from a three-phase AC power source, into a DC voltage of each phase of a three-phase AC load;
an inverter which comprises a plurality of neutral-point-clamped (NPC) legs per phase and converts the DC voltage converted by the converter, into a single-phase AC voltage of each phase of the three-phase AC load; and
a capacitor which is connected to a terminal between the converter and the inverter, wherein:
the converter comprises for each phase of an electric power system a circuit which consists of a plurality of switching elements connected in series; and
the electric power converting device further comprises a control unit which controls on/off of a switching element corresponding to one of phases of the electric power system in the converter such that a voltage which reduces fluctuation of a DC voltage applied between the converter and the inverter and corresponding to each phase of the three-phase AC load is output from the converter for each phase of the electric power system.

2. The electric power converting device according to claim 1, wherein the control unit
specifies a voltage of maximum fluctuation compared to an average of each phase among DC voltages applied between the converter and the inverter and corresponding to the each phase of the three-phase AC load, specifies a phase related to the voltage, and controls on/off of a switching element corresponding to the specified phase of the converter such that a voltage which reduces the fluctuation is output from the converter; and
specifies a voltage of maximum fluctuation other than the specified phase and among DC voltages of the each phase of the three-phase AC load, specifies a phase related to the voltage, and controls on/off of a switching element corresponding to the specified phase of the converter such that a voltage which reduces the fluctuation is output from the converter.

3. The electric power converting device according to claim 1, wherein the control unit
upon power running, specifies a minimum voltage among DC voltages applied between the converter and the inverter and corresponding to the each phase of the three-phase AC load, specifies a phase related to the voltage, and controls on/off of a switching element corresponding to the specified phase of the converter such that a voltage which increases the voltage is output from the converter and
specifies a minimum voltage among DC voltages of the each phase of the three-phase AC load other than that of the specified phase, specifies a phase related to the voltage, and controls on/off of a switching element corresponding to the specified phase of the converter such that a voltage which increases the voltage is output from the converter, and
upon regeneration, specifies a maximum voltage among the DC voltages of the each phase of the three-phase AC load between the converter and the inverter, specifies a phase related to the voltage, and controls on/off of a switching element corresponding to the specified phase of the converter such that a voltage which reduces the voltage is output from the converter; and
specifies a maximum voltage among DC voltages of the each phase of the three-phase AC load other than the specified phase, specifies a phase related to the voltage, and controls on/off of a switching element corresponding to the specified phase of the converter such that a voltage which reduces the voltage is output from the converter.

4. The electric power converting device according to claim 1, wherein:
the converter
comprises for each phase of an electric power system a circuit which consists of a plurality of switching elements connected in series and segmented at a neutral point; and
the control unit
controls, for each phase of the electric power system, on/off of a switching element corresponding to one of phases of the electric power system of the converter such that a voltage which reduces fluctuation of six DC voltages applied between the converter and the inverter and segmented on a high potential side and a low potential side at the neutral point corresponding to each phase of the three-phase AC load is output from the converter.

5. The electric power converting device according to claim 1, wherein the control unit:
upon power running, specifies a minimum voltage among DC voltages applied between the converter and the inverter and corresponding to the each phase of the three-phase AC load, specifies a phase related to the voltage, and controls on/off of a switching element corresponding to the specified phase of the converter such that a voltage which increases the voltage is output from the converter,
specifies a minimum voltage among DC voltages of the each phase of the three-phase AC load other than that of the specified phase, specifies a phase related to the voltage, and controls on/off of a switching element corresponding to the specified phase of the converter such that a voltage which increases the voltage is output from the converter, and
controls on/off of a switching element corresponding to a phase of the converter which is not specified such that a DC voltage of the phase which is not specified is not output from the converter; and upon regeneration, specifies a maximum voltage among the DC voltages of the each phase of the three-phase AC load between the converter and the inverter, specifies a phase related to the voltage, and controls on/off of a switching element corresponding to the specified phase of the converter such that a voltage which reduces the voltage is output from the converter, specifies a maximum voltage among DC voltages of the each phase of the three-phase AC load other than that of the specified phase, specifies a phase related to the voltage, and controls on/off of a switching element corresponding to the specified phase of the converter such that a voltage which reduces the voltage is output from the converter, and controls on/off control of the switching element corresponding to the phase of the converter which is not specified such that the DC voltage of the phase which is not specified is not output from the converter.

6. An electric power converting method used for an electric power converting device which comprises:

a converter which converts a three-phase AC voltage output from a three-phase AC power source, into a DC voltage of each phase of a three-phase AC load;

an inverter which comprises a plurality of neutral-point-clamped (NPC) legs per phase and converts the DC voltage converted by the converter, into a single-phase AC voltage of each phase of the three-phase AC load; and a capacitor which is connected to a terminal between the converter and the inverter, and wherein the converter comprises for each phase of an electric power system a circuit which consists of a plurality of switching elements connected in series, the electric power converting method comprising: controlling, for each phase of the electric power system, on/off of a switching element corresponding to one of phases of the electric power system in the converter such that a voltage which reduces fluctuation of a DC voltage applied between the converter and the inverter and corresponding to each phase of the three-phase AC load is output from the converter.

* * * * *